US010962063B2

United States Patent
Asano et al.

(10) Patent No.: US 10,962,063 B2
(45) Date of Patent: Mar. 30, 2021

(54) FIXED CONSTANT VELOCITY UNIVERSAL JOINT

(71) Applicant: NTN CORPORATION, Osaka (JP)

(72) Inventors: Yuichi Asano, Shizuoka (JP); Tomoshige Kobayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 370 days.

(21) Appl. No.: 15/769,130

(22) PCT Filed: Oct. 4, 2016

(86) PCT No.: PCT/JP2016/079493
§ 371 (c)(1),
(2) Date: Apr. 18, 2018

(87) PCT Pub. No.: WO2017/073267
PCT Pub. Date: May 4, 2017

(65) Prior Publication Data
US 2018/0313406 A1    Nov. 1, 2018

(30) Foreign Application Priority Data
Oct. 27, 2015    (JP) ............................. JP2015-210965

(51) Int. Cl.
*F16D 3/223*    (2011.01)

(52) U.S. Cl.
CPC ...... *F16D 3/223* (2013.01); *F16D 2003/2232* (2013.01); *Y10S 464/906* (2013.01)

(58) Field of Classification Search
CPC ............. F16D 3/223; F16D 2003/2232; Y10S 464/906
(Continued)

(56) References Cited

U.S. PATENT DOCUMENTS

| 3,263,448 A * | 8/1966 | Adams .................... F16D 3/224 |
|---|---|---|
| | | 464/145 |
| 2008/0234057 A1 | 9/2008 | Takekawa |
| 2017/0030415 A1 | 2/2017 | Oh et al. |

FOREIGN PATENT DOCUMENTS

| DE | 1 951 360 | 12/1966 |
|---|---|---|
| GB | 2 017 256 | 10/1979 |

(Continued)

OTHER PUBLICATIONS

International Search Report dated Dec. 27, 2016 in International (PCT) Application No. PCT/JP2016/079493.
(Continued)

*Primary Examiner* — Greg Binda
(74) *Attorney, Agent, or Firm* — Wenderoth, Lind & Ponack, L.L.P.

(57) ABSTRACT

A fixed type constant velocity universal joint includes an outer joint member having a cup shape, an inner joint member, which is received in the outer joint member, and transmits torque between the outer and inner joint members through intermediation of balls while allowing angular displacement, and a shaft, which is coupled to the inner joint member so as to allow torque transmission. A recessed portion is formed in a bottom portion of the outer joint member, and an embedded stopper that enters the recessed portion of the outer joint member is mounted to a shaft end portion of the shaft opposed to the recessed portion. The embedded stopper is allowed to interfere with the recessed portion of the outer joint member at an angle that is smaller than an incorporating angle of the balls and larger than a maximum operating angle during use of the joint.

4 Claims, 9 Drawing Sheets

(58) Field of Classification Search
    USPC .................................. 464/123, 124, 145, 906
    See application file for complete search history.

(56) References Cited

FOREIGN PATENT DOCUMENTS

| JP | 03-113124 | 5/1991 |
| JP | 2001-280359 | 10/2001 |
| JP | 2008-121794 | 5/2008 |
| WO | 2015/153431 | 10/2015 |

OTHER PUBLICATIONS

International Preliminary Report on Patentability and Written Opinion of the International Searching Authority dated May 1, 2018 in International (PCT) Application No. PCT/JP2016/079493.
Extended European Search Report dated Mar. 1, 2019 in corresponding European Patent Application No. 16859504.9.

\* cited by examiner

FIXED CONSTANT VELOCITY UNIVERSAL JOINT

TECHNICAL FIELD

The present invention relates to a fixed type constant velocity universal joint, which is to be used in power transmission systems for automobiles and various industrial machines, in particular, is to be mounted to a drive shaft for a rear wheel of an automobile and a propeller shaft for an automobile.

BACKGROUND ART

As a constant velocity universal joint which is used as a unit configured to transmit a rotational force at constant velocity from an engine to a wheel of an automobile, there are given two types, specifically, a fixed type constant velocity universal joint and a plunging type constant velocity universal joint. Both of those constant velocity universal joints each have a structure capable of coupling two shafts on a driving side and a driven side to each other, and transmitting rotational torque at constant velocity even when each of the two shafts forms an operating angle.

It is necessary that a drive shaft configured to transmit power from an engine to a wheel of an automobile be adaptable to angular displacement and axial displacement caused by a change in relative positional relationship between the engine and the wheel. Therefore, in general, the drive shaft has the following structure. The plunging type constant velocity universal joint which allows both the axial displacement and the angular displacement is installed on the engine side (inboard side), and the fixed type constant velocity universal joint which allows only the angular displacement is installed on the wheel side (outboard side). Both the constant velocity universal joints are coupled to each other through intermediation of the shaft.

The fixed type constant velocity universal joint described above cannot allow the axial displacement, but can allow a large operating angle (maximum operating angle of 45° or more). In this respect, the fixed type constant velocity universal joint described above is applied to a wheel side of a drive shaft for a front wheel of an automobile in many cases.

Meanwhile, the fixed type constant velocity universal joint is applied to a wheel side of a drive shaft for a rear wheel of an automobile or a propeller shaft for an automobile in some cases. In this case, unlike for the front wheel of an automobile, it is unnecessary to set the maximum operating angle to 45° or more. For the rear wheel of an automobile, the maximum operating angle is 20° or less, and for the propeller shaft, the maximum operating angle is 10° or less.

As described above, in the drive shaft for a rear wheel of an automobile, the maximum operating angle is 20° or less, which is small. Therefore, in order to attain reduction in weight and cost of the constant velocity universal joint, there is used an outer joint member, which is reduced in axial dimension by shortening track grooves as compared to an outer joint member to be used in the drive shaft for a front wheel of an automobile.

In this case, at the time of assembling a constant velocity universal joint for a front wheel, under a state in which an angle equal to or larger than the maximum operating angle is formed, balls are incorporated. After installing a shaft, the shaft and an outer joint member interfere with each other at an angle smaller than an angle allowing the balls to be incorporated. With this structure, the balls are prevented from slipping and dropping off track grooves of the outer joint member.

However, in the constant velocity universal joint including the outer joint member having a small axial dimension as described above, which is to be used in the drive shaft for a rear wheel of an automobile, when a large operating angle is formed, the operating angle exceeds the angle which causes the balls to drop off before the shaft interferes with the outer joint member, with the result that the balls slip and drop off the track grooves of the outer joint member.

In view of the above, there have been proposed various constant velocity universal joints each having a measure for preventing the balls from slipping and dropping off the track grooves of the outer joint member at the time of handling the constant velocity universal joint (for example, see Patent Literatures 1 and 2).

CITATION LIST

Patent Literature 1: JP 3-113124 A
Patent Literature 2: JP 2001-280359 A

SUMMARY OF INVENTION

Technical Problem

Incidentally, the constant velocity universal joints disclosed in Patent Literature 1 and Patent Literature 2, which each have the measure for preventing the balls from slipping and dropping off the track grooves of the outer joint member at the time of handling the constant velocity universal joint, have the following structures and problems.

The constant velocity universal joint disclosed in Patent Literature 1 has such stopper structure that an extended portion is formed on a shaft end portion of a shaft fitted to an inner joint member, and that the extended portion of the shaft is abuttable against a bottom portion of an outer joint member.

In the constant velocity universal joint, when the shaft forms an operating angle, which is larger than the maximum operating angle, with respect to the outer joint member, the extended portion of the shaft interferes with the bottom portion of the outer joint member, thereby preventing the balls from slipping and dropping off the track grooves of the outer joint member.

However, in a case of the constant velocity universal joint disclosed in Patent Literature 1, the shaft end portion of the shaft is elongated more than necessary, with the result that a weight of the shaft is increased. This increase in weight of the shaft involves a difficulty in reducing a weight of the constant velocity universal joint.

The constant velocity universal joint disclosed in Patent Literature 2 has such stopper structure that a protrusion is formed on a shaft fitted to an inner joint member on a portion of the shaft at a vicinity of an opening portion of an outer joint member, and that the protrusion is abuttable against an opening end portion of the outer joint member.

In the constant velocity universal joint, when, with respect to the outer joint member, the shaft forms an operating angle larger than the maximum operating angle, the protrusion of the shaft interferes with the opening end portion of the outer joint member. With this structure, the balls are prevented from slipping and dropping off track grooves of the outer joint member.

However, in a case of the constant velocity universal joint disclosed in Patent Literature 2, the protrusion is formed on the shaft. Thus, it is necessary to increase a material diameter before cutting work is performed to obtain the shaft. As a result, it is necessary to perform cutting work on the shaft to form the protrusion, and a material having a large diameter is required as a material for the shaft. Accordingly, in view of cost of cutting work and material, it is difficult to reduce cost of the constant velocity universal joint.

Therefore, the present invention has been proposed in view of the above-mentioned problems, and has an object to prevent balls from dropping off an outer joint member at the time of handling a constant velocity universal joint, and to easily achieve reduction in weight and cost of the constant velocity universal joint.

Solution to Problem

According to one embodiment of the present invention, there is provided a fixed type constant velocity universal joint, comprising: an outer joint member having a cup shape; an inner joint member, which is received in the outer joint member, and is configured to transmit torque between the inner joint member and the outer joint member through intermediation of balls while allowing angular displacement; and a shaft, which is coupled to the inner joint member so as to allow torque transmission.

As a technical measure for achieving the above-mentioned object, the present invention has a feature in that, to a shaft end portion of the shaft opposed to a bottom portion of the outer joint member, an angle regulating member is mounted so as to protrude toward the bottom portion of the outer joint member, and that the angle regulating member is allowed to interfere with the bottom portion of the outer joint member at an angle that is smaller than an incorporating angle of the balls and larger than a maximum operating angle during use of the joint.

In the present invention, the angle regulating member is mounted to the shaft end portion of the shaft, which is opposed to the bottom portion of the outer joint member, so as to protrude toward the bottom portion of the outer joint member. Thus, at the time of handling the constant velocity universal joint, the angle regulating member on the shaft interferes with the bottom portion of the outer joint member at an angle smaller than the incorporating angle of the balls, that is, at an angle smaller than the angle causing the balls to drop off. With this structure, the balls can be prevented from slipping and dropping off the outer joint member.

As described above, at the time of handling the constant velocity universal joint, the angle regulating member exerts a stopper function of regulating the operating angle of the shaft through interference with the bottom portion of the outer joint member. Meanwhile, at the operating angle equal to or smaller than the maximum operating angle during use of the joint, the angle regulating member does not interfere with the bottom portion of the outer joint member. With this structure, the constant velocity universal joint assembled to the vehicle body or the like can form a required operating angle.

As described above, the operating angle of the shaft is regulated through interference between the angle regulating member on the shaft and the bottom portion of the outer joint member. Accordingly, unlike in the related art, it is not necessary to extend the shaft end portion of the shaft. Thus, a weight of the constant velocity universal joint can be reduced. Further, it is not necessary to form the protrusion on the shaft. Thus, the material diameter of the shaft can be reduced, and cost of the constant velocity universal joint can be reduced.

In the present invention, it is desired to adopt a structure in which a recessed portion is formed in the bottom portion of the outer joint member so that the angle regulating member that enters the recessed portion is allowed to interfere with the recessed portion of the outer joint member. When this structure is adopted, at the time of handling the constant velocity universal joint, at an angle smaller than the angle causing the balls to drop off, the angle regulating member can be reliably caused to interfere with the recessed portion of the outer joint member. In this structure, owing to the recessed portion formed in the bottom portion of the outer joint member, at an operating angle equal to or smaller than the maximum operating angle during use of the joint, the angle regulating member can be reliably prevented from interfering with the bottom portion of the outer joint member.

In the present invention, it is desired to adopt a structure in which the shaft comprises a hollow shaft having a recessed hole passing through the hollow shaft in an axial direction, and in which the angle regulating member comprises an embedded stopper configured to close the recessed hole having an opening in the shaft end portion of the hollow shaft. When this structure is adopted, through use of the hollow shaft, reduction in weight of the constant velocity universal joint can be more easily achieved. Further, the embedded stopper, which is configured to inhibit a lubricant sealed in the outer joint member from flowing into the hollow shaft, exerts the stopper function.

Advantageous Effects of Invention

According to the present invention, at the time of handling the constant velocity universal joint, at the angle smaller than the angle causing the balls to drop off, the angle regulating member on the shaft interferes with the bottom portion of the outer joint member, thereby being capable of preventing the balls from slipping and dropping off the outer joint member. Thus, owing to the stopper structure involving interference between the bottom portion of the outer joint member and the angle regulating member mounted to the shaft end portion of the shaft, reduction in weight and cost of the constant velocity universal joint can be achieved.

DESCRIPTION OF EMBODIMENTS

Now, a fixed type constant velocity universal joint according to embodiments of the present invention is described in detail with reference to the drawings.

In the embodiments described below, for example, a Rzeppa type constant velocity universal joint (BJ) being one of fixed type constant velocity universal joints to be mounted to a drive shaft for an automobile is exemplified. However, the present invention is also applicable to an undercut-free type constant velocity universal joint (UJ) being another one of the fixed type constant velocity universal joints. Further, as a plunging type constant velocity universal joint to be mounted to the drive shaft, a double-offset type constant velocity universal joint (DOJ) is exemplified. However, the present invention is also applicable to a tripod type constant velocity universal joint (TJ).

Figure 1:
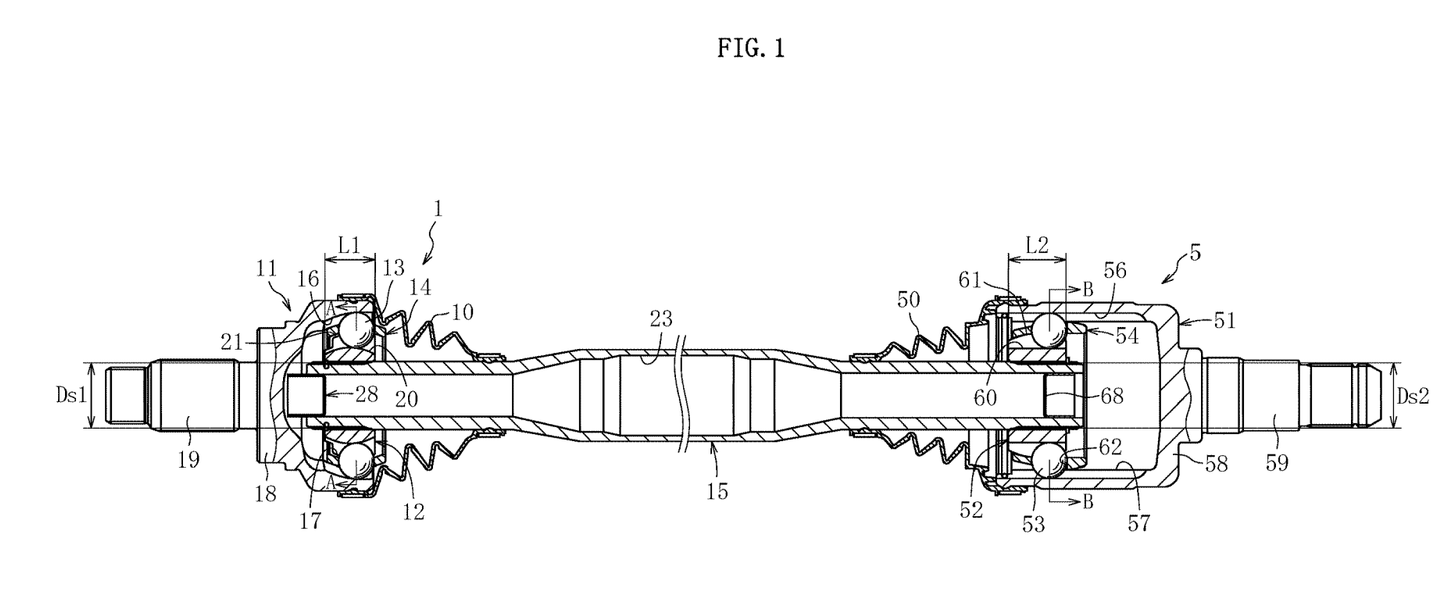
FIG. 1 is a sectional view for illustrating an entire configuration of a drive shaft for a rear wheel of an automobile according to an embodiment of the present invention.

It is necessary that a drive shaft configured to transmit power from an engine to a wheel of an automobile be adaptable to angular displacement and axial displacement caused by a change in relative positional relationship between the engine and the wheel. Accordingly, the drive shaft for a rear wheel of an automobile of this embodiment has the following structure. As illustrated in FIG. 1, a Rzeppa type constant velocity universal joint 1 that allows only angular displacement is installed on the wheel side (outboard side), and a double-offset type constant velocity universal joint 5 that allows both axial displacement and angular displacement is installed on the engine side (inboard side). Both the constant velocity universal joints 1 and 5 are coupled to each other through intermediation of a hollow shaft 15.

The Rzeppa type constant velocity universal joint 1 according to this embodiment comprises an outer joint member 11 having a cup-shape, an inner joint member 12, a plurality of balls 13, and a cage 14, and has the hollow shaft 15 coupled thereto, extending from the inner joint member 12 and projecting from an opening portion of the outer joint member 11.

Figure 4:
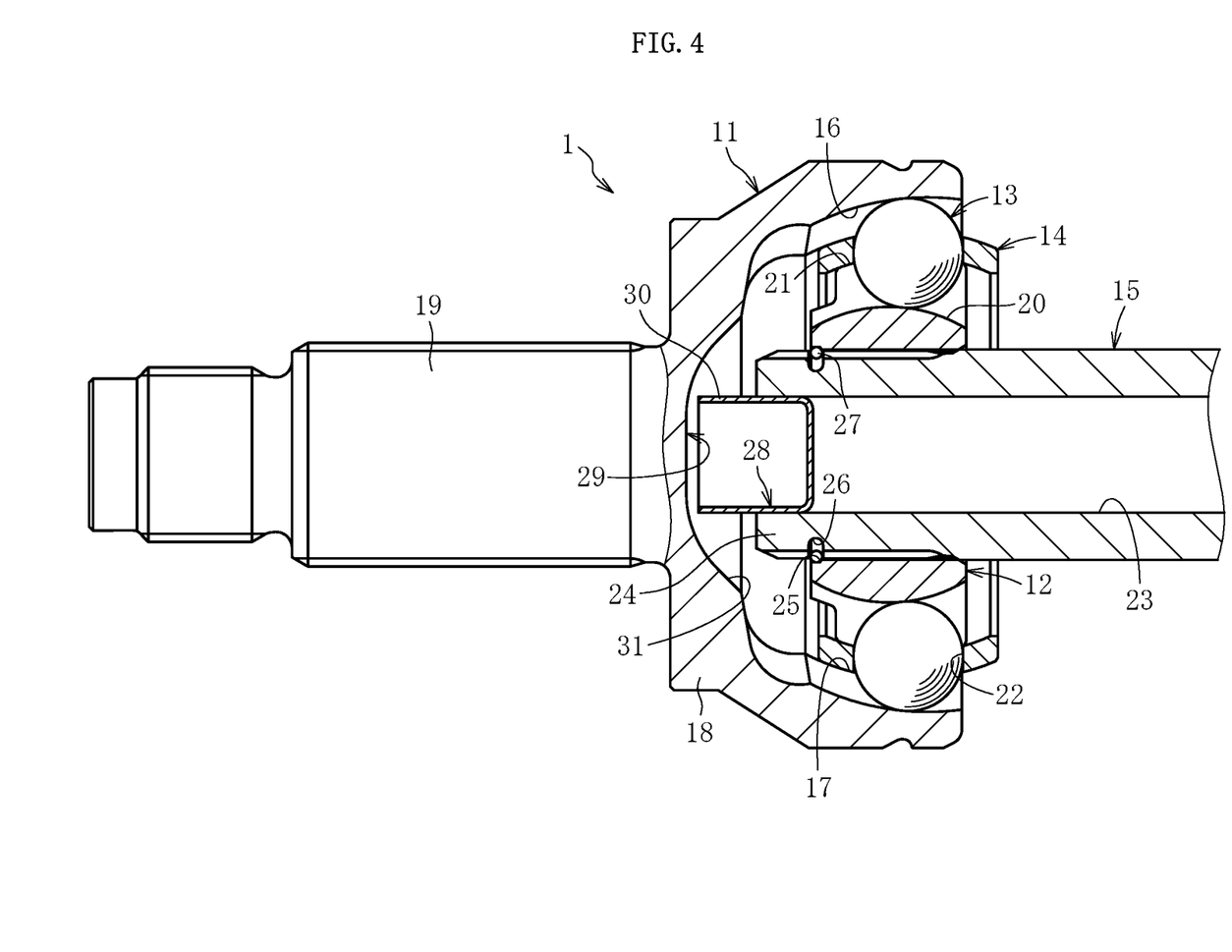
FIG. 4 is a sectional view for illustrating a state in which an operating angle of a hollow shaft is 0° in a fixed type constant velocity universal joint illustrated in FIG. 1.

As illustrated in FIG. 4, the outer joint member 11 has arc-shaped track grooves 16, which extend in an axial direction, and are formed equiangularly at a plurality of portions in a spherical inner peripheral surface 17. Further, a stem portion 19 is formed integrally with the bottom portion 18 of the outer joint member 11 so as to extend in the axial direction. The inner joint member 12 has arc-shaped track grooves 20, which are paired with the track grooves 16 of the outer joint member 11, and are formed equiangularly at a plurality of portions in a spherical outer peripheral surface 21.

The balls 13 are interposed between the track grooves 16 of the outer joint member 11 and the track grooves 20 of the inner joint member 12. The balls 13 are configured to transmit rotational torque between the outer joint member 11 and the inner joint member 12. The cage 14 is interposed between the inner peripheral surface 17 of the outer joint member 11 and the outer peripheral surface 21 of the inner joint member 12. The cage 14 has a plurality of pockets 22, which are configured to retain the balls 13 and are formed equiangularly at a plurality of portions in the cage 14.

The hollow shaft 15 has a recessed hole 23 passing through the hollow shaft 15 in the axial direction. The hollow shaft 15 is a member formed in the following manner. Specifically, a diameter-reducing process such as swaging or press drawing is performed to form a steel pipe (electric resistance welded pipe or seamless pipe) having a carbon content of 0.2% to 0.45%, and a spline is formed in a shaft end portion 24 of the steel pipe. Then, heat treatment such as induction hardening or carburizing and quenching is performed on the steel pipe.

The hollow shaft 15 is press-fitted into a shaft hole of the inner joint member 12, and is coupled to the inner joint member 12 by spline fitting so as to allow torque transmission. A step 25 is formed on a deep-side end portion of the inner joint member 12, and an annular recessed groove 26 is formed in the shaft end portion 24 of the hollow shaft 15. A snap ring 27 fitted in the recessed groove 26 is locked on the step 25 of the inner joint member 12. Thus, the hollow shaft 15 is prevented from slipping off the inner joint member 12.

In the Rzeppa type constant velocity universal joint 1 having the above-mentioned configuration, when an operating angle is formed by the hollow shaft 15 between the outer joint member 11 and the inner joint member 12, the balls 13 retained in the cage 14 are always maintained within a plane obtained by bisection of the operating angle at any operating angle. Accordingly, constant velocity is secured between the outer joint member 11 and the inner joint member 12. Rotational torque is transmitted between the outer joint member 11 and the inner joint member 12 through intermediation of the balls 13 under the state in which the constant velocity is secured therebetween.

A Rzeppa type constant velocity universal joint to be used in the drive shaft for a front wheel of an automobile can form an operating angle of up to 47°. In contrast, the Rzeppa type constant velocity universal joint 1 to be used in the drive shaft for a rear wheel of an automobile forms a maximum operating angle of 20° or less, which is small. Thus, the track grooves adaptable to a range of the operating angle of from 20° to 47° are not needed. Therefore, the track grooves 16 of the outer joint member 11 and the track grooves 20 of the inner joint member 12 can be shortened as compared to those of the Rzeppa type constant velocity universal joint to be used in the drive shaft for a front wheel of an automobile, with the result that axial dimensions of the outer joint member 11 and the inner joint member 12 can be reduced.

When the outer joint member 11 and the inner joint member 12 are reduced in axial dimension, an angle of incorporating the balls 13 can be reduced, and lengths of the pockets of the cage 14 can be also reduced. Thus, a load capacity of the cage 14 is increased. Further, when the maximum operating angle to be used is reduced, fluctuations in values of load applied on the respective balls 13 are reduced, with the result that peak load is reduced. Therefore, by an amount of increase of a torque load capacity of the constant velocity universal joint 1, a PCD of the balls can be reduced, and downsizing in a radial direction can be achieved.

Figure 2:
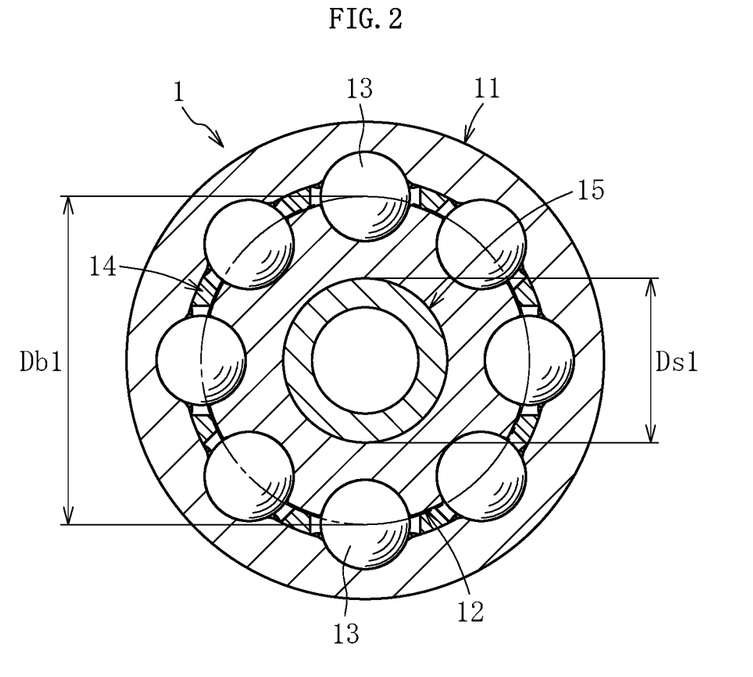
FIG. 2 is a sectional view taken along the line A-A of FIG. 1.

When the number of the balls 13 is eight (see FIG. 2), as compared to a case of a constant velocity universal joint comprising six balls, load applied on one ball is reduced. Thus, diameters of the balls can be reduced, and depths of the track grooves 16 of the outer joint member 11 and the track grooves 20 of the inner joint member 12 can be reduced.

As described above, in the Rzeppa type constant velocity universal joint 1 to be used in the drive shaft for a rear wheel, the inner joint member 12 has a small axial dimension, and the number of the balls 13 is set to eight. With this configuration, thicknesses of bottom portions of the track grooves at each end portion of the inner joint member 12 can be increased. Thus, a PCD of the spline can be increased, and a torque load capacity of a spline fitting region can be increased.

Further, as compared to a constant velocity universal joint for a front wheel, the Rzeppa type constant velocity universal joint 1 for a rear wheel, which comprises eight balls, can be downsized in the axial direction and the radial direction, and can have a large PCD of the spline. Thus, when L1, Db1, and Ds1 represent the axial dimension of the inner joint member 12, the PCD of the balls, and the PCD of the spline of the inner joint member 12, respectively, L1, Db1, Ds1 satisfy a condition of $L1/Ds1 \leq 0.9$, and a condition of $Db1/Ds1 \leq 2.1$.

Meanwhile, as illustrated in FIG. 1, the double-offset type constant velocity universal joint 5 to be used in the drive shaft for a rear wheel comprises an outer joint member 51 having a cup shape, an inner joint member 52, a plurality of balls 53, and a cage 54. The hollow shaft 15 is coupled to the double-offset type constant velocity universal joint 5 so as to extend from the inner joint member 52 and protrude from an opening portion of the outer joint member 51.

The outer joint member 51 has straight track grooves 56, which extend in the axial direction and are formed equiangularly at a plurality of portions in a cylindrical inner peripheral surface 57. Further, a stem portion 59 is formed integrally with the outer joint member 51 so as to extend from a bottom portion 58 of the outer joint member 51 in the axial direction. The inner joint member 52 has straight track grooves 60, which are paired with the track grooves 56 of the outer joint member 51 and are formed equiangularly at a plurality of portions in a spherical outer peripheral surface 61.

The balls 53 are interposed between the track grooves 56 of the outer joint member 51 and the track grooves 60 of the inner joint member 52. The balls 53 transmit rotational torque between the outer joint member 51 and the inner joint member 52. The cage 54 is interposed between the inner peripheral surface 57 of the outer joint member 51 and the outer peripheral surface 61 of the inner joint member 52. The cage 54 has a plurality of pockets 62, which are configured to retain the balls 53 and are formed equiangularly at a plurality of portions in the cage 54.

A double-offset type constant velocity universal joint to be used in the drive shaft for a front wheel can form an operating angle of up to about 25° to 30°. In contrast, in the double-offset type constant velocity universal joint 5 to be used in the drive shaft for a rear wheel, when a maximum operating angle is limited to 20° or less, the track grooves adaptable to an operating angle of 20° or more are not needed. Therefore, the track grooves 60 of the inner joint member 52 can be shortened as compared to those of the double-offset type constant velocity universal joint to be used in the drive shaft for a front wheel, with the result that an axial dimension of the inner joint member 52 can be reduced.

When the maximum operating angle to be used is reduced, lengths of the pockets of the cage 54 can be reduced, and a taper angle of an outer diameter of the cage 54 is also reduced. Thus, a load capacity of the cage 54 is increased. Further, when the maximum operating angle to be used is reduced, fluctuations in values of load applied to the respective balls 53 are reduced, with the result that peak load is reduced. Therefore, by an amount of increase of a torque load capacity of the constant velocity universal joint 5, a PCD of the balls can be reduced, and downsizing in the radial direction can be achieved.

Figure 3:
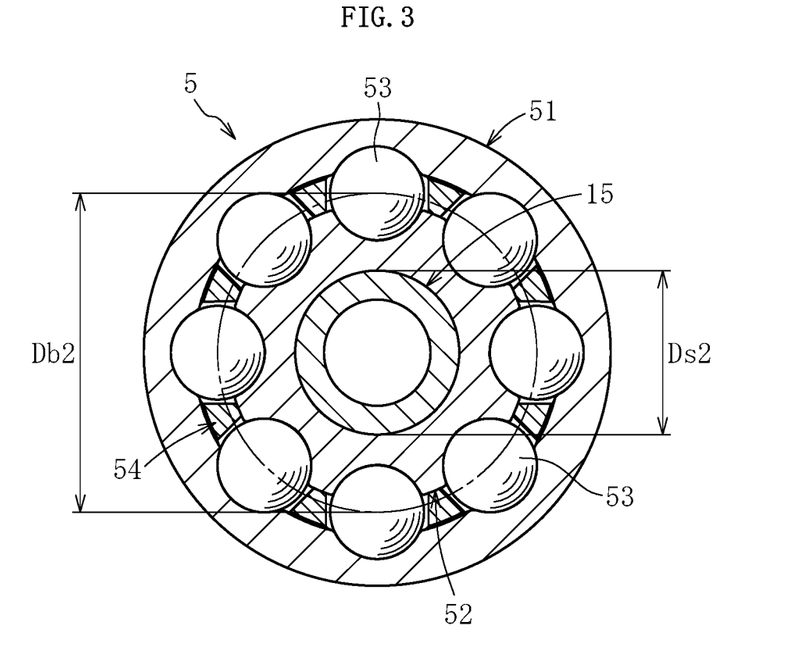
FIG. 3 is a sectional view taken along the line B-B of FIG. 1.

When the number of the balls 53 is eight (see FIG. 3), as compared to a case of a constant velocity universal joint comprising six balls, load applied on one ball is reduced. Thus, diameters of the balls can be reduced, and depths of the track grooves 56 of the outer joint member 51 and the track grooves 60 of the inner joint member 52 can be reduced. With this configuration, thicknesses of bottom portions of the track grooves of the inner joint member 52 can be increased. Thus, a PCD of the spline can be increased, and a torque load capacity of a spline fitting region can be increased.

Further, as compared to a constant velocity universal joint for a front wheel, the double-offset type constant velocity universal joint 5 for a rear wheel, which comprises eight balls, can be downsized in the axial direction and the radial direction, and can have a large PCD of the spline. Thus, when L2, Db2, and Ds2 represent the axial dimension of the inner joint member 52, the PCD of the balls, and the PCD of the spline of the inner joint member 52, respectively, L2, Db2, Ds2 satisfy a condition of $L2/Ds2 \leq 0.9$, and a condition of $Db2/Ds2 \leq 2.1$.

In a case of applying the above-mentioned Rzeppa type constant velocity universal joint 1 and the above-mentioned double-offset type constant velocity universal joint 5 to the drive shaft for a rear wheel, a PCD of the spline can be larger than a PCD of the spline in a case of applying the constant velocity universal joints to the drive shaft for a front wheel. Thus, a spline diameter of the hollow shaft 15 can be increased, and hence the hollow shaft 15 can have an allowance with respect to strength, thereby being capable of reducing a thickness of the spline fitting region as compared to that of a hollow shaft for the drive shaft for a front wheel.

When the thickness of the spline fitting region is reduced, a thickness of the steel pipe can be reduced. Not only reduction in thickness but also reduction in processing load during drawing are achieved, and manufacture is facilitated. Thus, cost, namely, material cost and processing cost can be reduced. In addition, as illustrated in FIG. 1, when thinning process is performed on a center portion of the hollow shaft 15, the hollow shaft 15 having a smaller weight can be obtained. The case of providing the eight balls is one example, and six balls may be provided. The number of the balls 13 and 53 may be freely selectable.

In this case, when the Rzeppa type constant velocity universal joint 1 is used in the drive shaft for a rear wheel, a bellows of a boot 10 of the Rzeppa type constant velocity universal joint 1 is not required to expand at a high operating angle. Thus, the number of pleats of the bellows and an outer diameter can be reduced as compared to those of a boot to be used for both a rear wheel and a front wheel, and downsizing can be achieved.

Further, when the double-offset type constant velocity universal joint 5 is used in the drive shaft for a rear wheel, the Rzeppa type constant velocity universal joint 1 does not form a high operating angle unlike a case of using the constant velocity universal joints for a front wheel. Thus, an amount of sliding of the double-offset type constant velocity universal joint 5 accompanied with bending of the Rzeppa type constant velocity universal joint 1 can be reduced, and a maximum operating angle of the double-offset type constant velocity universal joint 5 is set to 20° or less at the maximum. With this configuration, in a boot 50 of the double-offset type constant velocity universal joint 5, the number of pleats of a bellows and an outer diameter can be reduced as compared to those of the boot to be used for both a rear wheel and a front wheel, and downsizing can be achieved.

Figure 5:
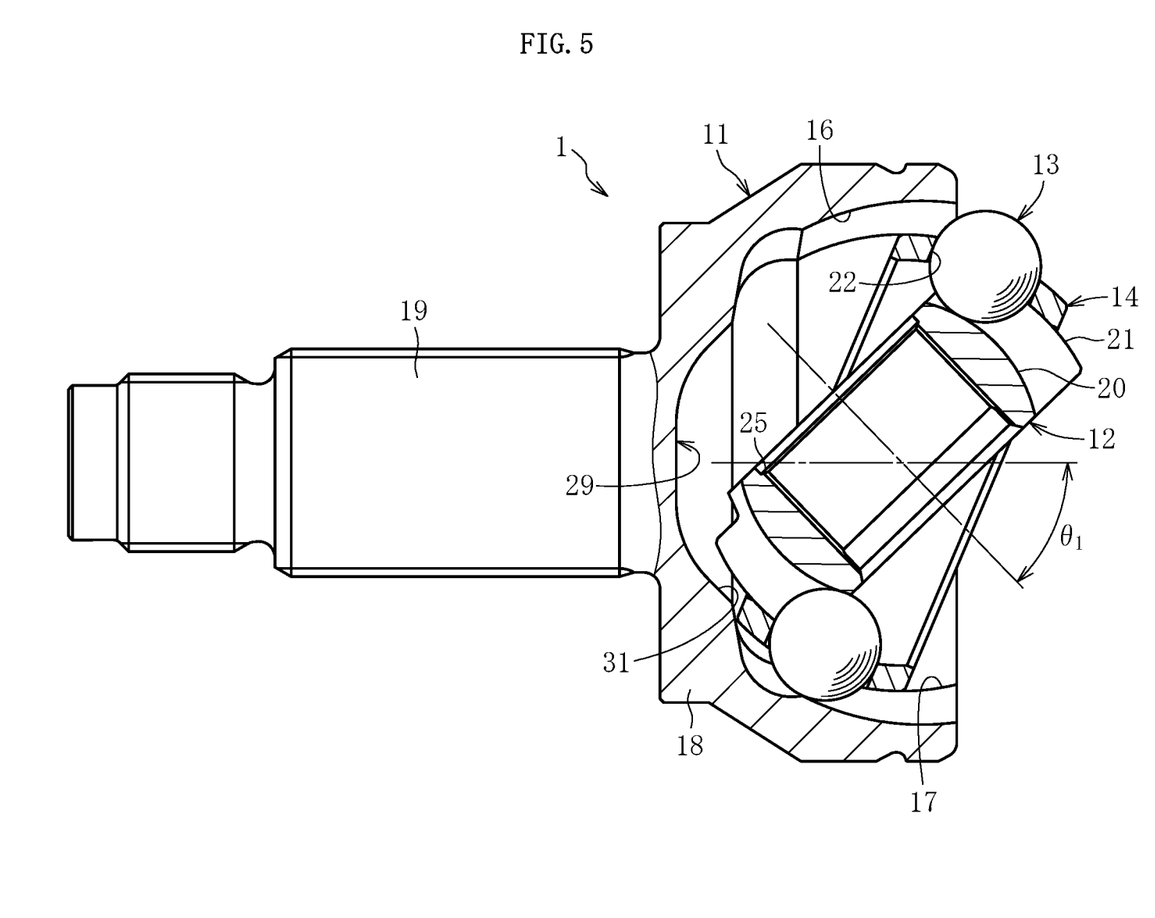
FIG. 5 is a sectional view for illustrating a state in which balls are incorporated into track grooves of an outer joint member and track grooves of an inner joint member illustrated in FIG. 4.

Meanwhile, at the time of assembling the Rzeppa type constant velocity universal joint 1 for a rear wheel illustrated in FIG. 4, as illustrated in FIG. 5, an angle θ (for example, $\theta_1=46°$) equal to or larger than the maximum operating angle is formed to ensure a position at which the pockets 22 of the cage 14 are visible from the outer joint member 11, and then the balls 13 are incorporated. After incorporating the balls 13, the hollow shaft 15, to which an embedded stopper 28 to be described later is mounted at the shaft end portion 24, is press-fitted into the shaft hole of the inner joint member 12, and the snap ring 27 is fitted so as to prevent the hollow shaft 15 from slipping off the inner joint member 12.

In this case, at the time of handling the constant velocity universal joint 1 having the balls incorporated therein, for example, at the time of transporting the constant velocity universal joint 1 or assembling the constant velocity universal joint 1 to a vehicle body, the outer joint member 11, the inner joint member 12, the balls 13, and the cage 14 constructing the constant velocity universal joint 1 are in a free state. In the free state, even when the maximum operating angle during use of the joint is set to 20° or less, due to own weights of the components, the constant velocity universal joint 1 may form an angle exceeding the maximum operating angle (see FIG. 5).

As described above, at the time of handling the constant velocity universal joint 1, even when the outer joint member 11, the inner joint member 12, the balls 13, and the cage 14 constructing the constant velocity universal joint 1 are in the free state, the constant velocity universal joint may form the angle exceeding the maximum operating angle, and the balls 13 may slip and drop off the track grooves 16 of the outer joint member 11. As a measure for preventing the balls 30 from slipping and dropping off, in this embodiment, the following stopper structure is adopted in order to regulate the operating angle of the constant velocity universal joint 1 at the time of handling the constant velocity universal joint 1.

The Rzeppa type constant velocity universal joint 1 for a rear wheel according to the embodiment illustrated in FIG. 4 has such structure that the embedded stopper 28 being an angle regulating member is mounted to the shaft end portion 24 of the hollow shaft 15, which is opposed to the bottom portion 18 of the outer joint member 11, so as to protrude toward the bottom portion 18 of the outer joint member 11. Meanwhile, the constant velocity universal joint 1 has such structure that a recessed portion 29 is formed in the bottom portion 18 of the outer joint member 11, and that a distal end portion 30 of the embedded stopper 28 enters the recessed portion 29.

In the stopper structure constructed by the embedded stopper 28 of the hollow shaft 15 and the recessed portion 29 of the outer joint member 11, the distal end portion 30 of the embedded stopper 28 can interfere with a peripheral edge region 31 of the recessed portion 29 of the outer joint member 11 at an angle that is smaller than an incorporating angle of the balls 13 and larger than the maximum operating angle during use of the joint.

The recessed portion 29 of the outer joint member 11 has a funnel shape having a depth gradually decreasing radially outwardly from a flat surface at an axial center thereof. That is, the recessed portion 29 has such a shape as to prevent the distal end portion 30 of the embedded stopper 28 from interfering with a region other than the peripheral edge region 31 at an angle smaller than the maximum operating angle during use of the joint.

The recessed portion 29 can be formed by performing cutting work on the bottom portion 18 of the outer joint member 11. Alternatively, the recessed portion 29 can be formed at the same time as the outer joint member 11 is formed by forging process. In this case, the number of processing steps and cost can be reduced.

The embedded stopper 28 is formed of a bottomed tubular member formed by press working. An outer diameter of the embedded stopper 28 is set to be slightly larger than an inner diameter of the recessed hole 23 of the hollow shaft 15. Thus, the embedded stopper 28 is press-fitted into the recessed hole 23 of the hollow shaft 15.

In this embodiment, the embedded stopper 28 is press-fitted into the recessed hole 23 of the hollow shaft 15, but another fitting structure may be adopted. For example, the outer diameter of the embedded stopper 28 may be set to be equal to the inner diameter of the recessed hole 23 of the hollow shaft 15, and the embedded stopper 28 may be fixed to the recessed hole 23 of the hollow shaft 15 with an adhesive.

The embedded stopper 28 exerts a stopper function together with the recessed portion 29 of the outer joint member 11, and closes the recessed hole 23 having an opening in the shaft end portion 24 of the hollow shaft 15. Thus, the embedded stopper 28 has a function of preventing a lubricant such as grease, which is sealed in the outer joint member 11 with the boot 10 (see FIG. 1) mounted on the outer joint member 11 and the hollow shaft 15, from leaking into the hollow shaft 15 from an inside of the outer joint member 11.

Also in the constant velocity universal joint 5 (see FIG. 1), an embedded stopper 68 is press-fitted into the recessed hole 23 of the hollow shaft 15, and the recessed hole 23 having the opening in the shaft end portion of the hollow shaft 15 is closed by the embedded stopper 68. The embedded stopper 68 has a function of preventing a lubricant such as grease, which is sealed in the outer joint member 51 with the boot 50 mounted on the outer joint member 51 and the hollow shaft 15, from leaking into the hollow shaft 15 from an inside of the outer joint member 51.

Figure 6:
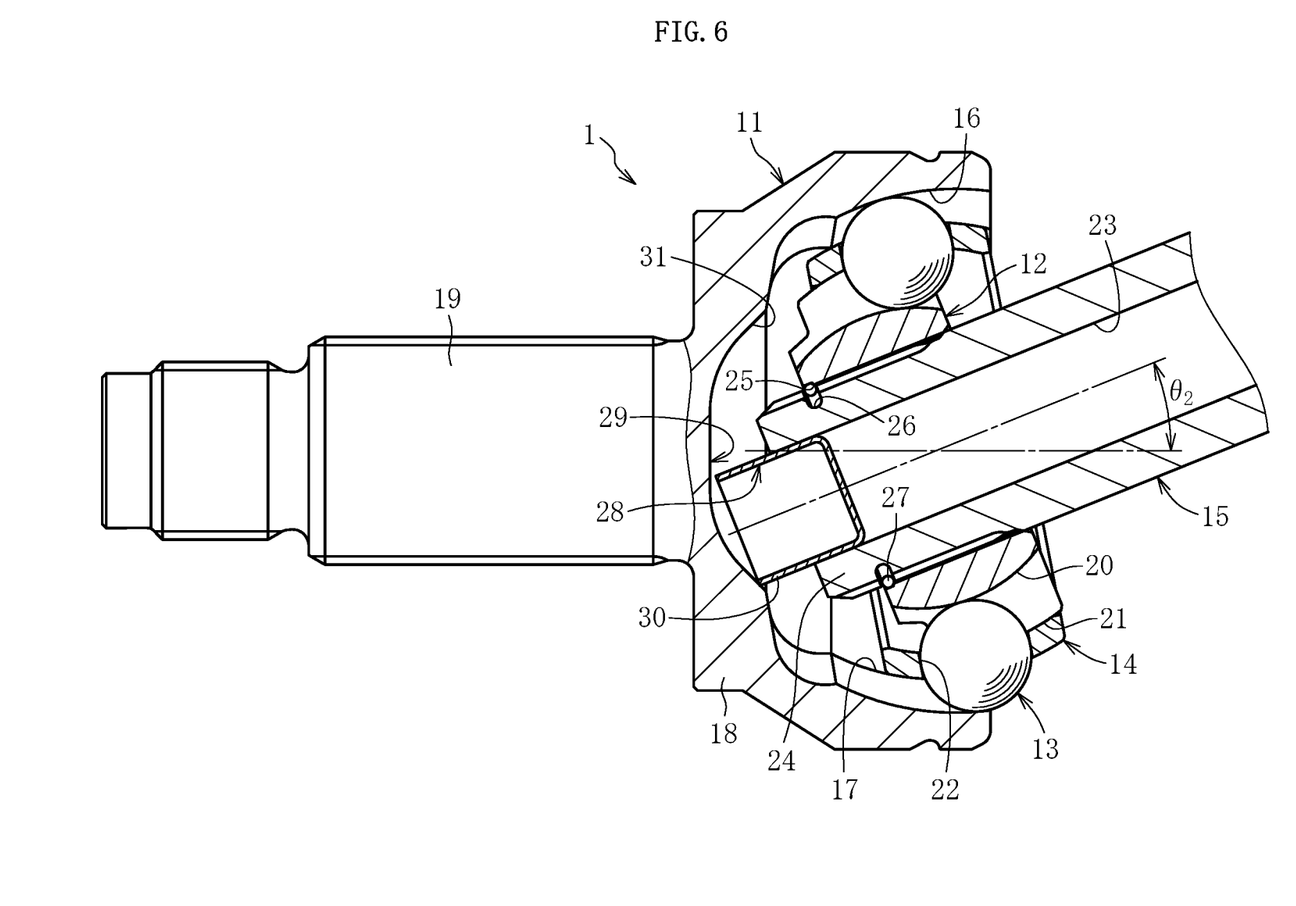
FIG. 6 is a sectional view for illustrating a state in which the hollow shaft is subjected to angle regulation by the stopper structure in the fixed type constant velocity universal joint illustrated in FIG. 4.

In the Rzeppa type constant velocity universal joint 1 for a rear wheel illustrated in FIG. 4, owing to the stopper structure constructed by the embedded stopper 28 of the hollow shaft 15 and the recessed portion 29 of the outer joint member 11, at the time of handling the constant velocity universal joint 1, for example, at the time of transporting the constant velocity universal joint 1 or assembling the constant velocity universal joint 1 to the vehicle body, as illustrated in FIG. 6, at the incorporating angle $\theta_1$ of the balls 13 (see FIG. 5), that is, at an angle $\theta_2$ (for example, $\theta_2=22°$) smaller than an angle causing the balls 13 to drop off, the distal end portion 30 of the embedded stopper 28 comes into abutment against the peripheral edge region 31 of the recessed portion 29, and the embedded stopper 28 interferes with the bottom portion 18 of the outer joint member 11.

In this manner, the embedded stopper 28 interferes with the peripheral edge region 31 of the recessed portion 29, to thereby exert the stopper function of regulating the operating angle of the hollow shaft 15 to the angle $\theta_2$ smaller than the angle $\theta_1$ causing the balls 13 to drop off. As a result, at the time of handling the constant velocity universal joint 1, the balls 13 can be prevented from slipping and dropping off the track grooves 16 of the outer joint member 11.

Further, the angle allowing the embedded stopper 28 of the hollow shaft 15 to interfere with the peripheral edge region 31 of the recessed portion 29 is set to the angle $\theta_2$ ($\theta_2=22°$) larger than the maximum operating angle (for example, 20° or less) during use of the joint. Accordingly, after handling the constant velocity universal joint 1, the constant velocity universal joint 1 assembled to the vehicle body can form a required operating angle.

The angle allowing the embedded stopper 28 of the hollow shaft 15 to interfere with the peripheral edge region 31 of the recessed portion 29 may be set to an angle other than the above-mentioned angle $\theta_2$ (=22°) as long as the angle allowing the interference is smaller than the incorporating angle of the balls 13 and larger than the maximum operating angle during use of the joint. The angle allowing the interference can be adjusted in accordance with a diameter and a position of the recessed portion 29 and the outer diameter and a position of the embedded stopper 28.

As described above, the operating angle of the hollow shaft 15 is regulated through interference between the embedded stopper 28 of the hollow shaft 15 and the recessed portion 29 of the outer joint member 11. Accordingly, unlike in the related art, it is not necessary to extend the shaft end portion 24 of the hollow shaft 15. Thus, reduction in weight of the constant velocity universal joint 1 can be achieved. Further, it is not necessary to form a protrusion on the hollow shaft 15. Thus, a material diameter of the hollow shaft 15 can be reduced, and reduction in cost of the constant velocity universal joint 1 can be achieved.

In this embodiment, the structure of mounting the lightweight embedded stopper 28 to the shaft end portion 24 of the hollow shaft 15 is adopted. With this structure, increase in weight of the constant velocity universal joint 1 can be prevented. In addition, further reduction in weight of the constant velocity universal joint 1 can be achieved when the hollow shaft 15 is used.

Figure 7:
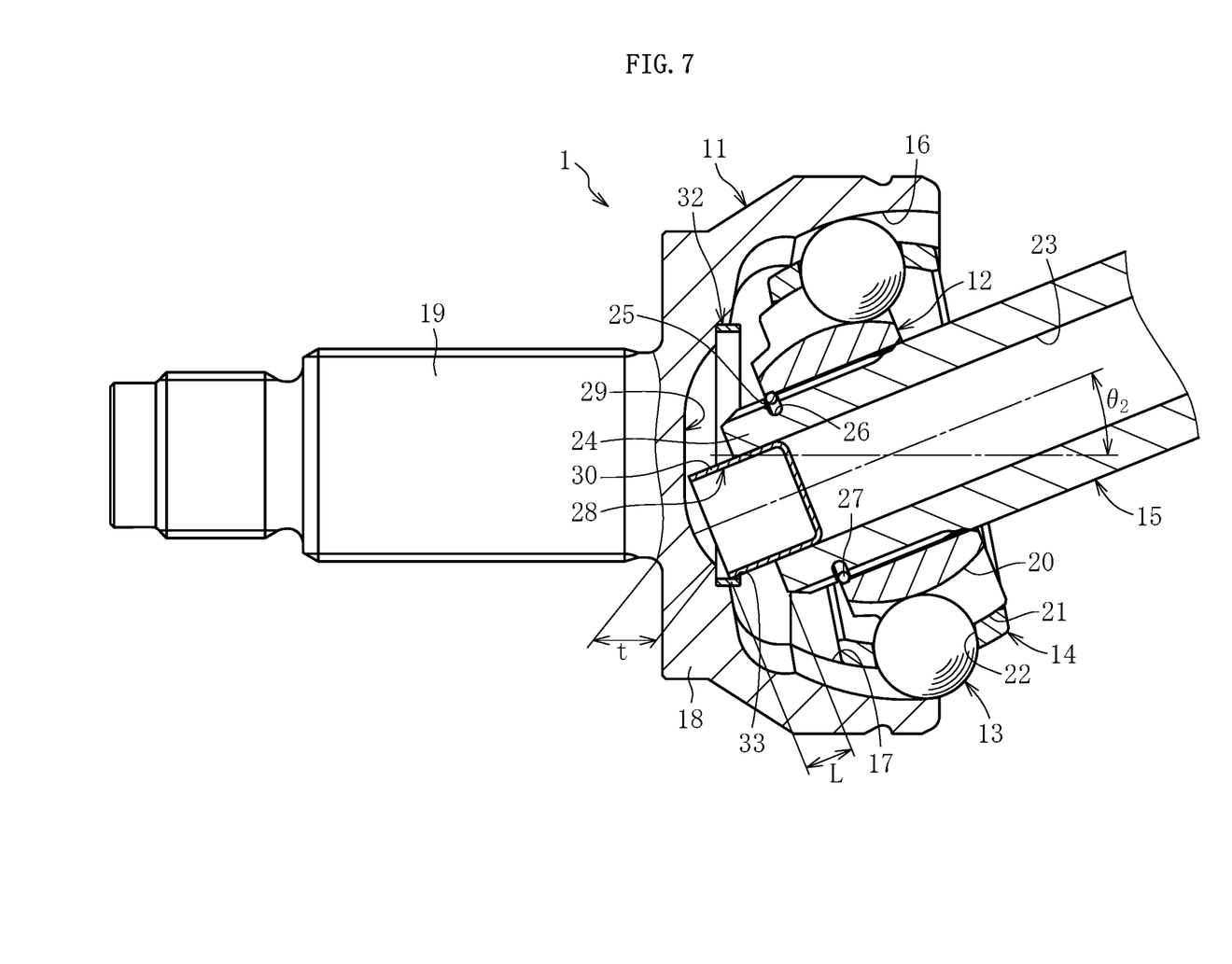
FIG. 7 is a sectional view for illustrating a state in which the hollow shaft is subjected to angle regulation by the stopper structure of another embodiment of the present invention.

In the above-mentioned embodiment, description is made of the structure that allows the embedded stopper 28 of the hollow shaft 15 to interfere with the peripheral edge region 31 of the recessed portion 29 of the outer joint member 11, but the present invention is not limited thereto. For example, the structure illustrated in FIG. 7 may be adopted. FIG. 7 is an illustration of a state in which the hollow shaft 15 is subjected to angle regulation by the stopper structure. The same components as those of FIG. 6 are denoted by the same reference symbols, and redundant description is omitted.

As illustrated in FIG. 7, the constant velocity universal joint 1 according to this embodiment has such stopper structure that a ring-like member 32 is fitted to the bottom portion 18 of the outer joint member 11, and that the embedded stopper 28 of the hollow shaft 15 can interfere with an inner peripheral region 33 of the ring-like member 32. The ring-like member 32 is fitted to the peripheral edge region of the recessed portion 29 of the outer joint member 11 so as to project to the hollow shaft side along the axial direction.

As described above, the ring-like member 32 projects to the hollow shaft side. Thus, an axial position of the inner peripheral region 33, with which the embedded stopper 28 of the hollow shaft 15 interferes, is closer to the hollow shaft side than that in the case of the constant velocity universal joint 1 illustrated in FIG. 6. As a result, a protruding amount L of the embedded stopper 28 from the hollow shaft 15 can be reduced.

Along with the reduction in protruding amount, the recessed portion 29 of the outer joint member 11 can be reduced. Thus, a thickness t (axial dimension) of the bottom portion 18 of the outer joint member 11 can be increased. As a result, strength in the bottom portion 18 of the outer joint member 11 is easily secured.

Figure 8:
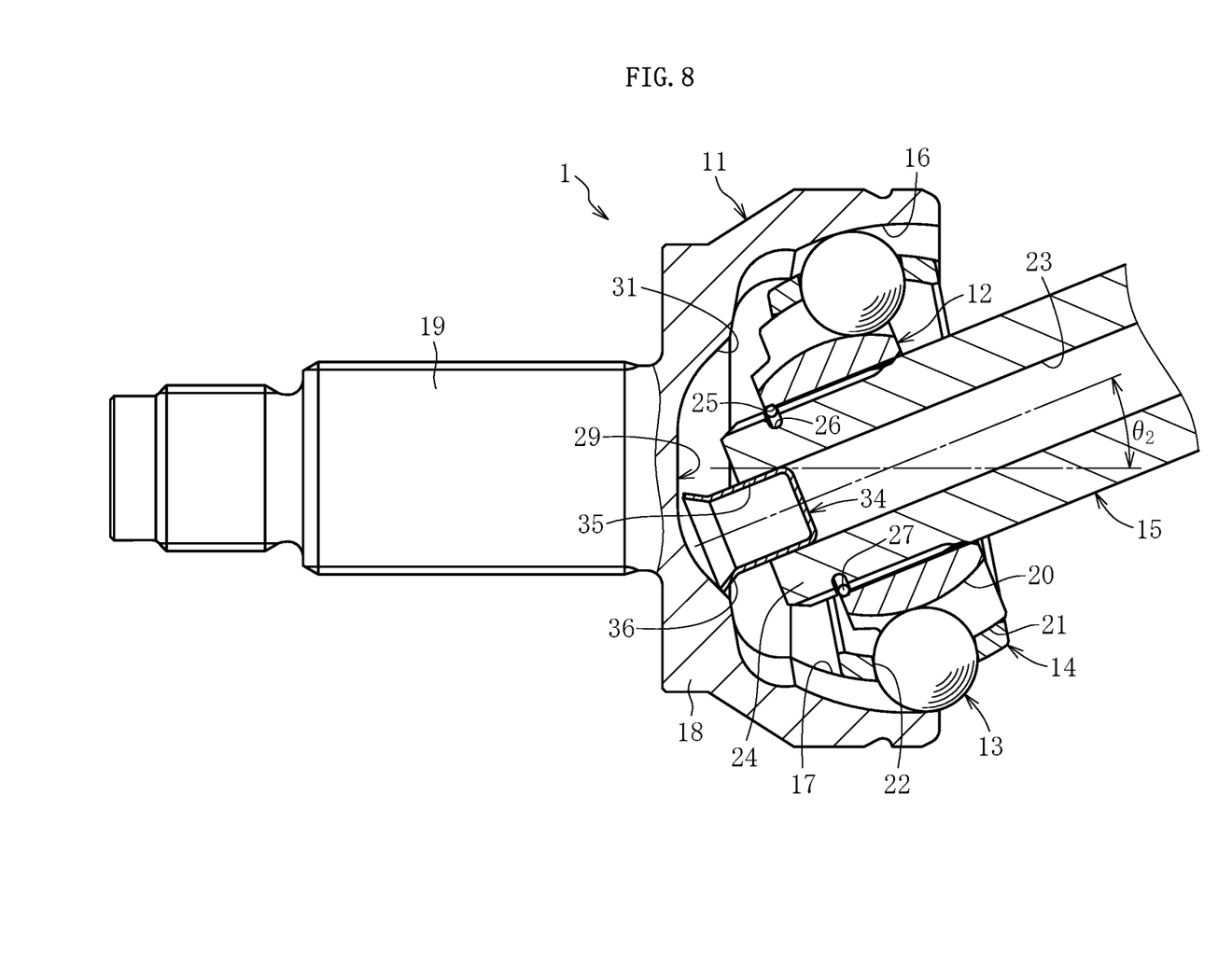
FIG. 8 is a sectional view for illustrating a state in which the hollow shaft is subjected to angle regulation by the stopper structure of still another embodiment of the present invention.

Further, in the above-mentioned embodiment, the embedded stopper 28 having a uniform diameter and a bottomed tubular shape is exemplified. However, as illustrated in FIG. 8, when the inner diameter of the recessed hole 23 of the hollow shaft 15 is smaller than that in the case of the constant velocity universal joint 1 illustrated in FIG. 6, the stopper structure having the following embedded stopper 34 is suitable. In FIG. 8, the same components as those of FIG. 6 are denoted by the same reference symbols, and redundant description is omitted.

The embedded stopper 34 illustrated in FIG. 8 comprises a bottomed tubular portion 35, and an enlarged diameter portion 36 formed integrally with a distal end portion of the bottomed tubular portion 35. In the embedded stopper 34, the bottomed tubular portion 35 is press-fitted into the recessed hole 23 of the hollow shaft 15, and the enlarged diameter portion 36 can interfere with the recessed portion 29 of the outer joint member 11.

In the constant velocity universal joint 1 according to this embodiment, at the time of handling the constant velocity universal joint 1, the operating angle of the hollow shaft 15 can be regulated to the angle $\theta_2$ that is smaller than the angle $\theta_1$ causing the balls 13 to drop off, and larger than the maximum operating angle during use of the joint in such a manner that the enlarged diameter portion 36 of the embedded stopper 34 is caused to interfere with the peripheral edge region 31 of the recessed portion 29 of the outer joint member 11.

Although not illustrated, when the inner diameter of the recessed hole 23 of the hollow shaft 15 is larger than that in the case of the constant velocity universal joint 1 illustrated in FIG. 6, conversely, the stopper structure comprising the following embedded stopper is suitable. The embedded stopper comprises a bottomed tubular portion, and a reduced diameter portion formed integrally with a distal end of the bottomed tubular portion.

It is only necessary that the embedded stopper 28 or the embedded stopper 34 have strength enough to reliably subject the hollow shaft 15 to angle regulation without deforming at the time of interference with the recessed portion 29 of the outer joint member 11 or the ring-like member 32. The embedded stopper 28 or the embedded stopper 34 may be made of metal such as steel or aluminum, or made of a resin such as a reinforced plastic. When reduction in weight of the constant velocity universal joint 1 is taken into consideration, a lightweight resin embedded stopper is effective.

Figure 9:
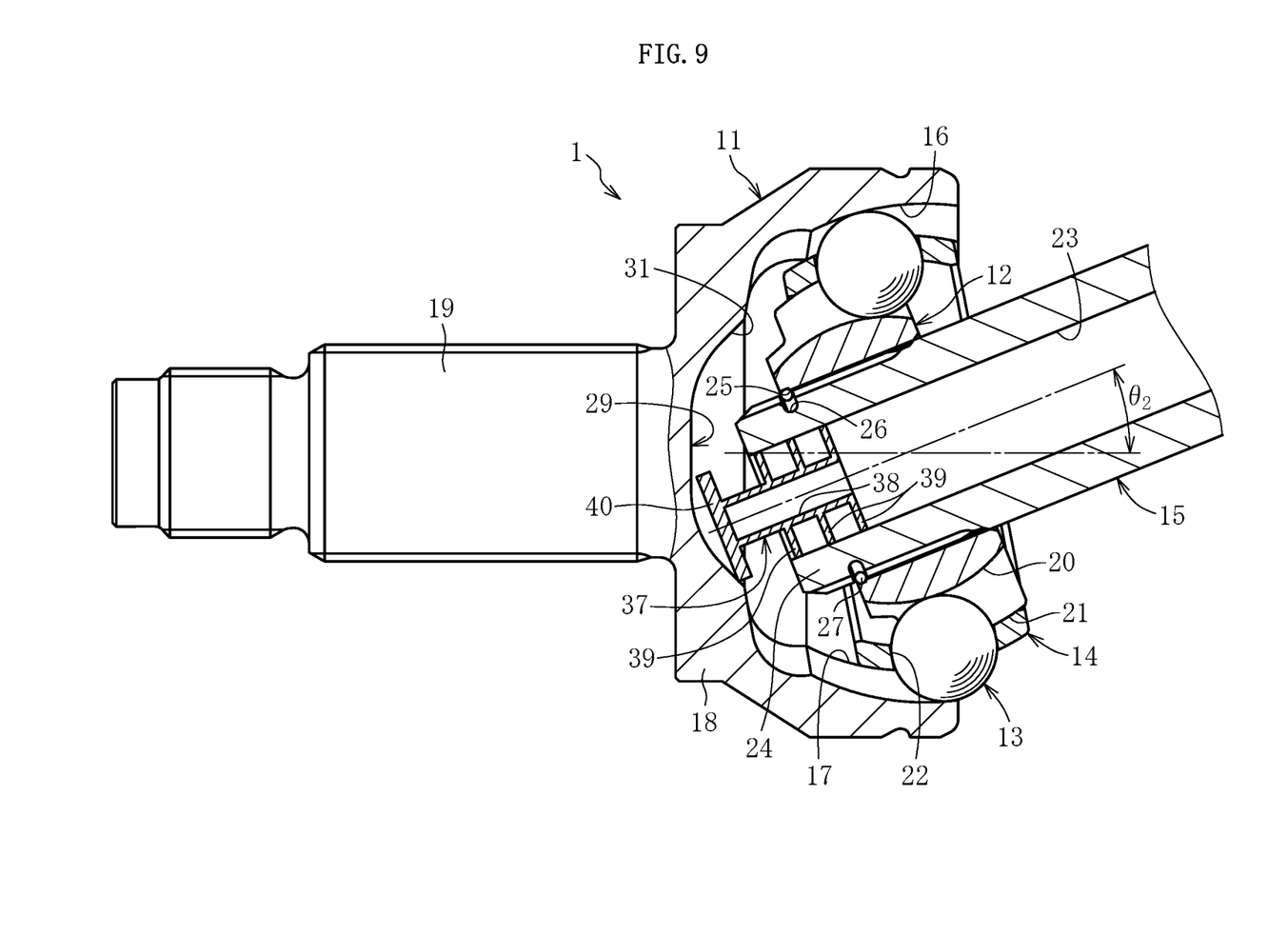
FIG. 9 is a sectional view for illustrating a state in which the hollow shaft is subjected to angle regulation by the stopper structure of still another embodiment of the present invention.

When the resin embedded stopper is used, there can be adopted such stopper structure that an embedded stopper 37 having a shape as illustrated in FIG. 9 is fitted to the recessed hole 23 of the hollow shaft 15. In FIG. 9, the same components as those of FIG. 6 are denoted by the same reference symbols, and redundant description is omitted.

The embedded stopper 37 of this embodiment comprises a tubular portion 38 extending along an axial center of the hollow shaft 15, a plurality of collar portions 39 formed integrally with a proximal end portion of the tubular portion 38, and a flange portion 40 formed integrally with a distal end portion of the tubular portion 38. In the embedded stopper 37, the collar portions 39 are press-fitted into the recessed hole 23 of the hollow shaft 15, and the flange portion 40 can interfere with the recessed portion 29 of the outer joint member 11. The number of the collar portions 39 may be determined as appropriate in accordance with fitting strength.

In the constant velocity universal joint 1 according to this embodiment, at the time of handling the constant velocity universal joint 1, the operating angle of the hollow shaft 15 can be regulated to the angle $\theta_2$ that is smaller than the angle $\theta_1$ causing the balls 13 to drop off, and larger than the maximum operating angle during use of the joint in such a manner that the flange portion 40 of the embedded stopper 37 is caused to interfere with the peripheral edge region 31 of the recessed portion 29 of the outer joint member 11.

Figure 10:
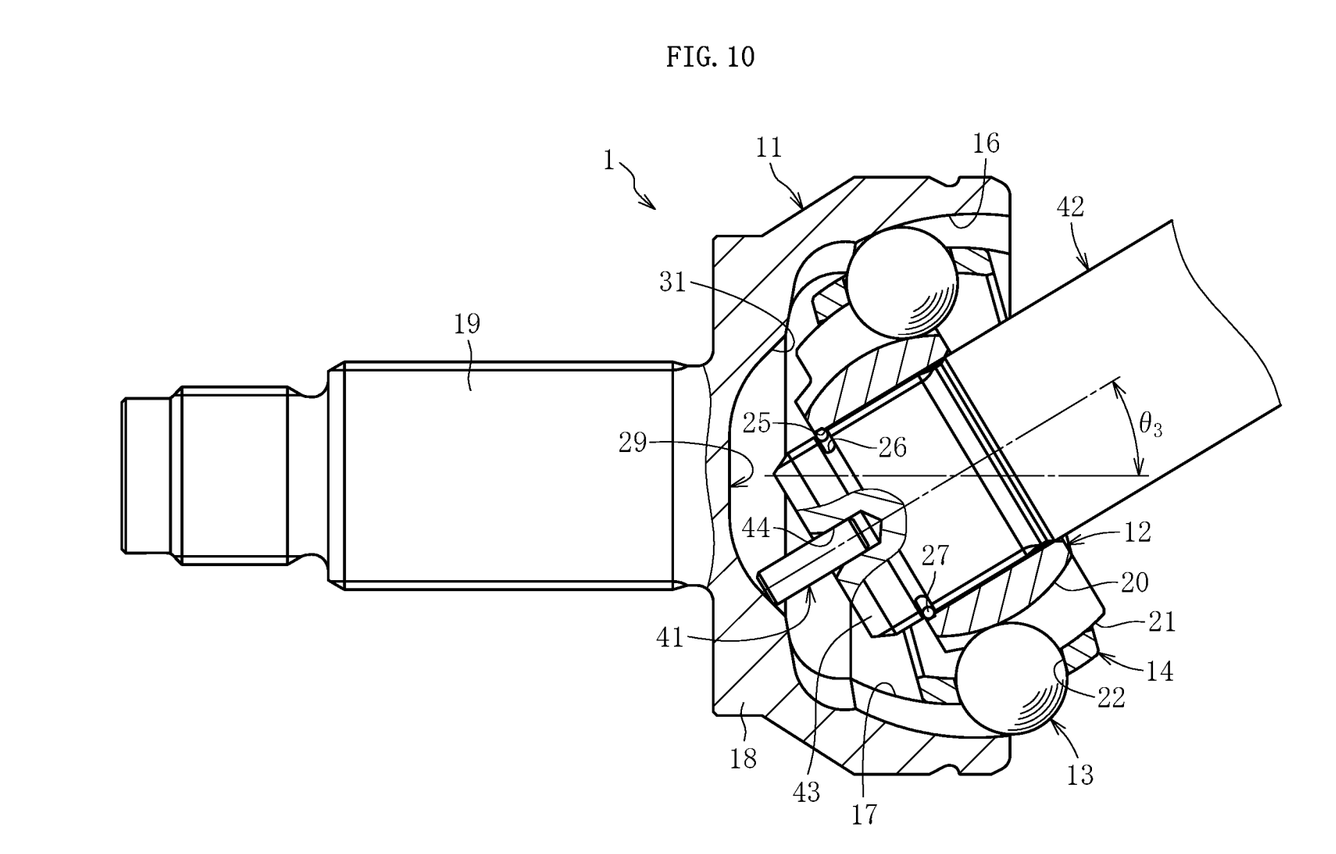
FIG. 10 is a sectional view for illustrating a state in which the hollow shaft is subjected to angle regulation by the stopper structure of still another embodiment of the present invention.

In the above-mentioned embodiments, the hollow shaft 15 having the recessed hole 23 passing therethrough in the axial direction is exemplified. However, there may be adopted a solid shaft in which a recessed portion, to which the embedded stopper 28, the embedded stopper 34, or the embedded stopper 37 can be mounted, is formed in a shaft end portion of the solid shaft. Further, in a case of the solid shaft, there can be adopted the stopper structure as illustrated in FIG. 10, which comprises a pin-like member 41 being the angle regulating member.

In the stopper structure, a mounting hole 44 is formed in a shaft end portion 43 of a solid shaft 42, and the pin-like member 41 is mounted in the mounting hole 44. When a center hole formed during processing of the solid shaft 42 is used as the mounting hole 44 as it is, cost can be reduced without increasing processing steps.

In the constant velocity universal joint 1 according to this embodiment, at the time of handling the constant velocity universal joint 1, an operating angle of the solid shaft 42 can be regulated to an angle $\theta_3$ ($\theta_3=31°$) that is smaller than the angle $\theta_1$ causing the balls 13 to drop off, and larger than the maximum operating angle during use of the joint in such a manner that a distal end portion of the pin-like member 41 is caused to interfere with the peripheral edge region 31 of the recessed portion 29 of the outer joint member 11.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

The invention claimed is:

1. A fixed type constant velocity universal joint, comprising:

an outer joint member having a cup shape;

an inner joint member, which is received in the outer joint member, and is configured to transmit torque between the inner joint member and the outer joint member through intermediation of balls while allowing angular displacement; and a shaft, which is coupled to the inner joint member so as to allow torque transmission, wherein, to a shaft end portion of the shaft opposed to a bottom portion of the outer joint member, an angle regulating member is mounted so as to protrude toward the bottom portion of the outer joint member and interfere with a recessed portion formed in the bottom portion of the outer joint member at an operating angle smaller than an operating angle at which the shaft interferes with the outer joint member, wherein the angle regulating member is configured to interfere with the recessed portion at an angle that is smaller than an incorporating angle of the balls and larger than a maximum operating angle during use of the fixed type constant velocity universal joint, and wherein the angle regulating member does not interfere with the recessed portion at an operating angle equal to or smaller than the maximum operating angle during use of the fixed type constant velocity universal joint.

2. The fixed type constant velocity universal joint according to claim 1, wherein the angle regulating member is formed of a bottomed tubular member formed by press-working.

3. The fixed type constant velocity universal joint according to claim 2, wherein the shaft comprises a hollow shaft having a recessed hole passing through the hollow shaft in an axial direction, and wherein the angle regulating member comprises an embedded stopper configured to close the recessed hole having an opening in the shaft end portion of the hollow shaft.

4. The fixed type constant velocity universal joint according to claim 1, wherein the shaft comprises a hollow shaft having a recessed hole passing through the hollow shaft in an axial direction, and wherein the angle regulating member comprises an embedded stopper configured to close the recessed hole having an opening in the shaft end portion of the hollow shaft.

* * * * *